United States Patent [19]

Vargo

[11] Patent Number: 4,649,578
[45] Date of Patent: Mar. 17, 1987

[54] KITTY BOX

[76] Inventor: Steve P. Vargo, 3055 Burris Rd., Lot 329, Fort Lauderdale, Fla. 33314

[21] Appl. No.: 837,775

[22] Filed: Mar. 10, 1986

[51] Int. Cl.$^4$ ............................................. A01K 29/00
[52] U.S. Cl. ............................................. 4/449; 119/1
[58] Field of Search .................. 4/449, 455, 479, 481, 4/258, 283; 119/1; 220/1 C; 141/331, 339, 1

[56] References Cited

U.S. PATENT DOCUMENTS

| | | | |
|---|---|---|---|
| 122,741 | 1/1872 | Sullivan | 4/481 |
| 1,330,828 | 2/1920 | Wilson | 4/258 |
| 2,440,783 | 5/1948 | Peart | 4/283 |
| 3,107,028 | 10/1963 | De Robertis | . |
| 3,111,932 | 11/1963 | Knutson | 119/1 |
| 3,407,429 | 10/1968 | Nardo | . |
| 3,476,083 | 11/1969 | Vander Wall | 119/1 |
| 3,796,188 | 3/1974 | Bradstreet | 119/1 |
| 3,818,865 | 6/1974 | Sinclair | 119/1 |
| 3,890,931 | 6/1975 | Saver | 119/1 |
| 3,908,597 | 9/1975 | Taylor | 119/1 |
| 3,921,582 | 11/1975 | Sedlmeir | 119/1 |
| 4,217,857 | 8/1980 | Geddie | 119/1 |

FOREIGN PATENT DOCUMENTS

| | | | |
|---|---|---|---|
| 444466 | 10/1912 | France | 4/479 |
| 1818 | of 1863 | United Kingdom | 4/481 |
| 215188 | 5/1924 | United Kingdom | 4/479 |

Primary Examiner—James E. Bryant, III
Assistant Examiner—L. J. Peters
Attorney, Agent, or Firm—Oltman and Flynn

[57] ABSTRACT

A kitty box is provided for use in the home, camper or van. The kitty box allows pets to perform their excretory functions inside during times of confinement. Cats and small dogs can be trained to perform their excretory functions atop the kitty box. Solid feces stay on top of a screen platform which lifts off for easy cleaning. Urine passing through the screen platform is caught by a funnel which in turn empties into a urine container. The urine container is conveniently lifted out of the kitty box for ease of cleaning. The urine container, funnel, support grill and screen platform all lift out of the kitty box for ease of cleaning.

3 Claims, 4 Drawing Figures

KITTY BOX

FIELD OF THE INVENTION

The present invention relates to portable commodes for pets.

BACKGROUND OF THE INVENTION

Small portable commodes for use by pets in houses, campers or vans are well known in the art. Some types of pet commodes teach the use of a screen platform to support the pet during his bowel and urinary excretions. The screen catches the solid feces. Other devices teach the use of a funnel base for directing urine into a receiving container. The applicant is unaware of any device which effectively combines these two basic design features into an inexpensive and easy to clean assembly.

SUMMARY OF THE INVENTION

It is, therefore, the object of the present invention to provide a low cost, easy to manufacture pet commode having a screen platform and a urine funnel emptying into a removable urine container.

Another object of the present invention is to house the screen platform and urine container in a single supporting box.

Another object of the present invention is to provide structural support for the screen platform by means of a simple grill.

Other objects of this invention will appear from the following description and appended claims, reference being had to the accompanying drawings forming a part of this specification wherein like reference characters designate corresponding parts in the several views.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

Figure 1:
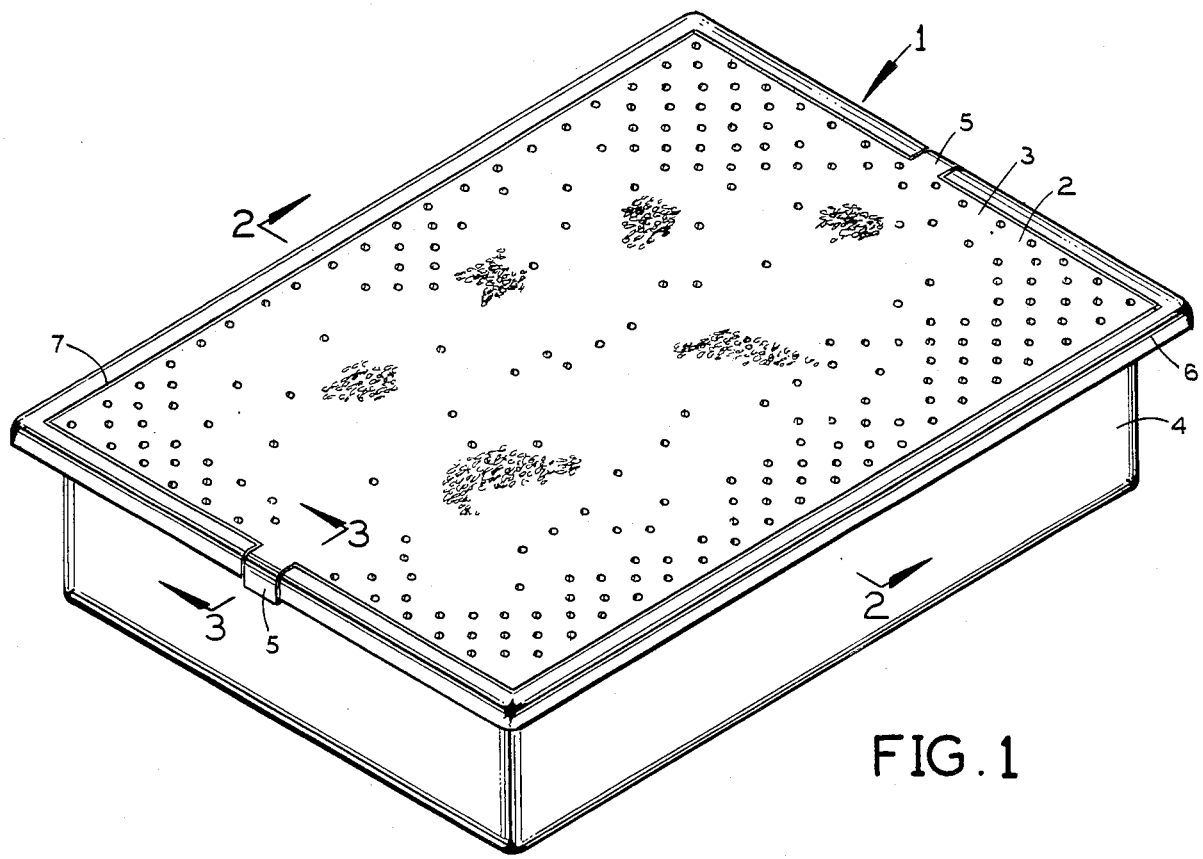
FIG. 1 is a top perspective view of the kitty box.

Referring first to FIG. 1, kitty box 1 is shown fully assembled. A small amount of kitty litter has been scattered atop screen platform 2. Support box 4 supports screen platform 2 by means of a ridge 6. The edge 7 of screen platform 2 rests in a matching groove 8 in ridge 6 (see FIG. 2). Clips 5 on screen platform 2 rest in grooves 40 in ridge 6 (see FIG. 4) and enable the screen to be lifted out easily.

Figure 2:
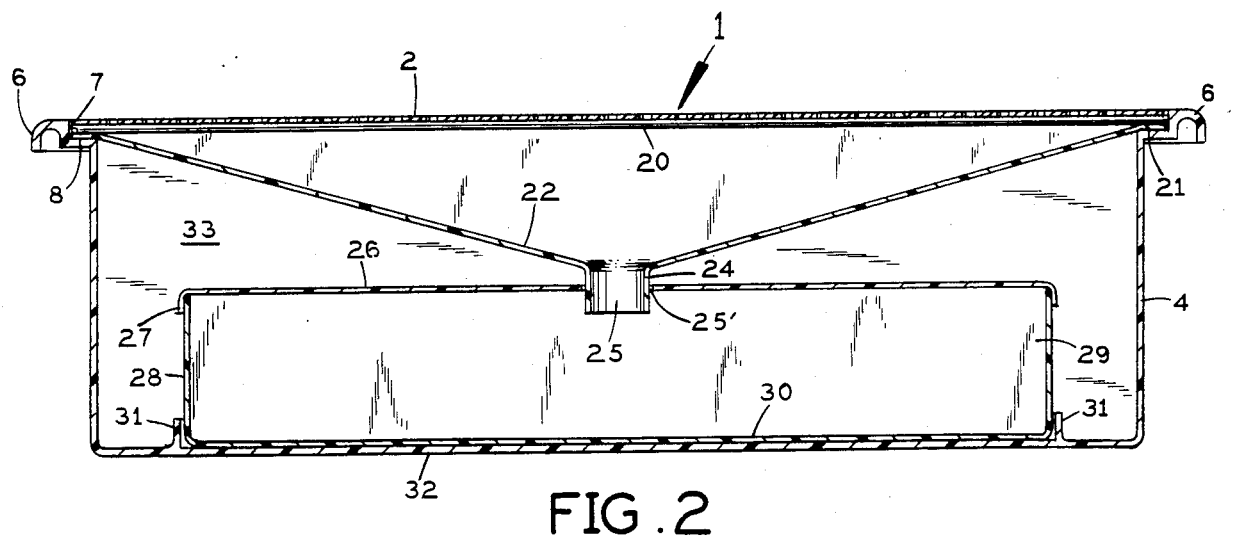
FIG. 2 is a cross sectional view of the kitty box taken along line 2—2 of FIG. 1.

FIG. 2 shows the screen platform 2 assembled atop grill 20 which in turn is assembled atop support rim 21 of funnel 22 which in turn is assembled atop matching groove 8 in ridge 6. Urine passes through screen platform 2, through grill 20, onto funnel 22, into funnel neck 24, through orifice 25 and into urine container 29. Solid feces stay on top of the screen platform. Urine container 29 consists of lid 26 having an orifice 25' and retention lip 27. Lid 26 rests atop the sides 28 of urine container 29. The sides 28 connect to the bottom 30 of urine container 29. The urine container 29 is held in place on the bottom 32 of support box 4 by means of wall 31. Grill 20 functions as a weight support for pets standing on screen platform 2, which is semi-rigid. Screen platform 2, grill 20, funnel 22 and urine container 29 all lift out of support box 4 for ease of cleaning (see FIG. 4).

Figure 3:
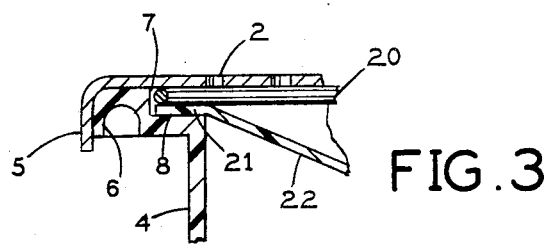
FIG. 3 is a detailed fragmentary view taken along line 3—3 of FIG. 1 of the support means of the screen platform and grill.

FIG. 3 shows edge 7 of screen platform 2 resting atop grill 20 which in turn rests atop support rim 21 of funnel 22, which in turn is supported by matching groove 8 of support box 4.

Figure 4:
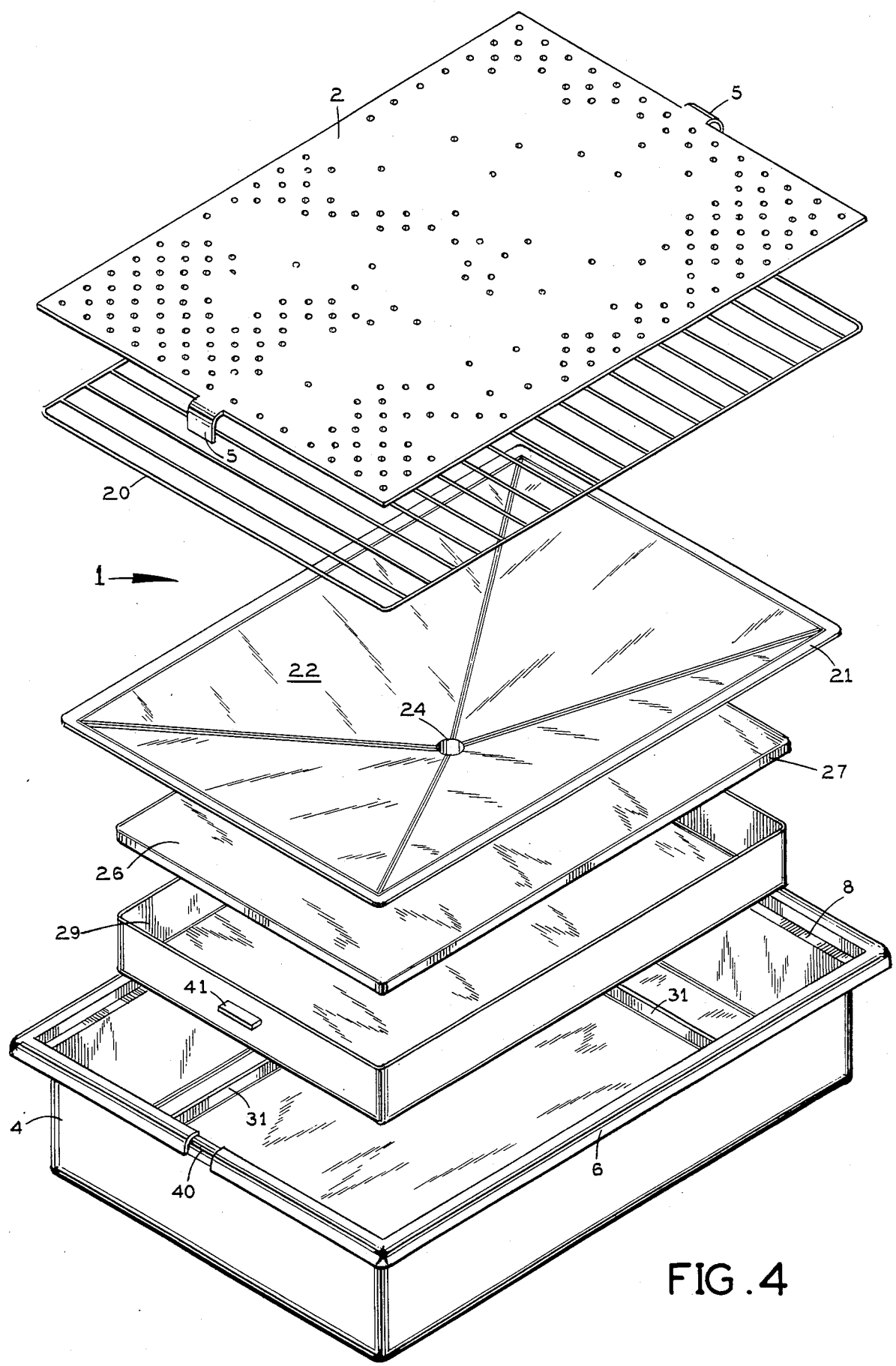
FIG. 4 is a top perspective exploded view of the kitty box showing the structural components prior to final assembly.

FIG. 4 shows a parts explosion view of kitty box 1. A handle 41 is provided on each end of urine container 29 for added ease of lifting urine container 29.

I claim:

1. A portable pet commode comprising:
   a support box;
   said support box further comprising a bottom and sides;
   a urine container detachably mounted inside said support box;
   a funnel having a neck;
   said funnel further comprising an outer circumferential portion cooperatively mounted atop said sides of said support box;
   said funnel functioning to empty liquids into said urine container;
   a support grill detachably mounted on said outer circumferential portion of said funnel; and
   a screen platform detachably mounted atop said support grill,
   said urine container being detachably secured inside said support box by means of a wall on the inside bottom of said support box.

2. A portable pet commode comprising:
   a support box;
   said support box further comprising a bottom and sides;
   a urine container detachably mounted inside said support box;
   a funnel having a neck;
   said funnel further comprising an outer circumferential portion cooperatively mounted atop said sides of said support box;
   said funnel functioning to empty liquids into said urine container;
   a support grill detachably mounted on said outer circumferential portion of said funnel; and
   a screen platform detachably mounted atop said support grill, and
   a lid having a hole cooperatively aligned with said neck of said funnel, said lid functioning to catch liquids from said funnel and contain said liquids inside said urine container.

3. The portable pet commode of claim 1 wherein said sides of said support box further comprise a ridge along the top;
   said ridge further comprises a groove;
   said groove supports said funnel, said grill and said screen platform.

* * * * *